(12) United States Patent
Mills et al.

(10) Patent No.: US 7,240,894 B2
(45) Date of Patent: Jul. 10, 2007

(54) PULSE WIDTH MODULATED SOLENOID

(75) Inventors: David Mills, Lake Orion, MI (US); Ryan True, Clawson, MI (US); Aaron Biefer, Waterford, MI (US)

(73) Assignee: BorgWarner Inc., Auburn Hills, MI (US)

( * ) Notice: Subject to any disclaimer, the term of this patent is extended or adjusted under 35 U.S.C. 154(b) by 9 days.

(21) Appl. No.: 10/823,466

(22) Filed: Apr. 13, 2004

(65) Prior Publication Data

US 2004/0238775 A1   Dec. 2, 2004

Related U.S. Application Data

(60) Provisional application No. 60/474,774, filed on May 30, 2003.

(51) Int. Cl.
*F16K 31/02* (2006.01)
(52) U.S. Cl. ............... 251/129.14; 251/129.15
(58) Field of Classification Search ........ 251/129.14–129.22; 137/625.64, 625.65
See application file for complete search history.

(56) References Cited

U.S. PATENT DOCUMENTS

| | | | |
|---|---|---|---|
| 4,592,533 A * | 6/1986 | Guglielmi et al. | 251/30.01 |
| 4,807,846 A * | 2/1989 | Greiner et al. | 251/129.15 |
| 4,998,559 A | 3/1991 | McAuliffe, Jr. | |
| 5,346,176 A * | 9/1994 | Fujimoto et al. | 251/129.15 |
| 5,669,406 A * | 9/1997 | Gluf, Jr. | 137/270 |
| 5,752,689 A * | 5/1998 | Barkhimer et al. | 251/129.15 |
| 5,795,038 A * | 8/1998 | Fuller et al. | 303/119.2 |
| 6,029,703 A * | 2/2000 | Erickson et al. | 137/625.61 |
| 6,152,422 A * | 11/2000 | Staib et al. | 251/129.15 |
| 6,343,621 B1 | 2/2002 | Holmes et al. | |
| 6,439,265 B1 * | 8/2002 | Gruschwitz et al. | 251/129.15 |
| 6,446,885 B1 * | 9/2002 | Sims et al. | 251/129.15 |
| 6,489,870 B1 * | 12/2002 | Ward et al. | 335/220 |
| 6,748,992 B1 * | 6/2004 | Neubauer et al. | 156/378 |
| 6,918,570 B2 * | 7/2005 | Ahn | 251/129.15 |

* cited by examiner

*Primary Examiner*—Eric Keasel
*Assistant Examiner*—Cloud Lee
(74) *Attorney, Agent, or Firm*—Warn, Hoffman, Miller & Ozga, P.C.; Greg Dziegielewski

(57) ABSTRACT

A pulse width modulated solenoid control valve is described, wherein the valve includes a polymer fluid control body. The body includes a segmented fluid flow path for providing strength to the fluid control body assembly. Stand off ribs are provided to improve assembly into a control manifold. A casing forms an integral flux tube. A tapered push rod is used to reduce flux shorting.

30 Claims, 5 Drawing Sheets

PULSE WIDTH MODULATED SOLENOID

CROSS-REFERENCE TO RELATED APPLICATION

The instant application claims priority to U.S. Provisional Patent Application Ser. No. 60/474,774, filed May 30, 2003, the entire specification of which is expressly incorporated herein by reference.

FIELD OF THE INVENTION

The present invention generally relates to solenoid control valves, and more particularly to a pulse width modulated solenoid control valve for controlling hydraulic functions of a transmission for a vehicle.

BACKGROUND OF THE INVENTION

Various solenoid designs have been used in the automotive industry, including those for use in conjunction with automatic transmission systems. For example, automatic transmission control systems generally employ solenoids in order to control the pressure and flow of the transmission fluid. In this manner, the control of transmission fluid pressure can be used to engage and disengage a transmission clutch in response to an electrical input signal supplied to the solenoid, or the control of transmission fluid pressure can be used to maintain transmission line pressure.

Generally, solenoids employ a solenoid control valve to aid in the regulation of the fluid flow by the solenoid. An example of a solenoid control valve can be found in U.S. Pat. No. 4,998,559 to McAuliffe et al., the entire specification of which is incorporated herein by reference. Recently, the use of pulse width modulated solenoids has become more prevalent in certain automotive applications.

Although pulse width modulated conventional solenoid control valves have been somewhat successful in meeting the demands of the automotive industry, these pulse width modulated solenoid control valves can be further improved upon, e.g., in the areas of cost, quality, performance, and the like.

Accordingly, there exists a need for new and improved pulse width modulated solenoid control valves.

SUMMARY OF THE INVENTION

A new and improved solenoid control valve is provided, in accordance with the general teachings of the present invention. More specifically, a new and improved pulse width modulated solenoid control valve is provided, in accordance with one embodiment of the present invention The solenoid control valve preferably employs a plastic control valve body that preferably includes a segmented flow path that adds strength to the supply tube portion. In accordance with a preferred embodiment of the present invention, a stepped coil portion is preferably provided. In accordance with another preferred embodiment of the present invention, an actuation rod is preferably provided that is tapered adjacent to and contacting the armature so as to reduce flux shorting and improve operating characteristics. Accordingly, the solenoid control valve of the present invention preferably provides a characteristic performance curve.

In accordance with a first embodiment of the present invention, a solenoid fluid control valve is provided, comprising: (1) a fluid control body adapted for being received in a fluid housing, said fluid control body including a central cavity, and having a pressure supply passage at a first end and a radially extending pressure control passage; (2) a feed supply tube positioned in said central cavity, said feed supply tube including an outer diameter in communication with the pressure control passage, and including an inner bore operably connected to said pressure supply passage, said feed supply tube being supported in said central cavity of said fluid control body by way of a radially and axially extending wall, said wall being segmented into a plurality of longitudinally extending flow chambers, said feed supply tube including a valve receiving chamber area; (3) a valve seat portion being made of a metallic material and press fit into said fluid control body, said valve seat portion including a valve seat and a passage in communication between said valve seat and said pressure control passage; (4) a valve contained in said valve receiving chamber operable to selectively close off communication between said pressure supply passage and said pressure control passage; and (5) a solenoid for opening said valve in response to a signal.

In accordance with a second embodiment of the present invention, a solenoid fluid control valve is provided, comprising: (1) a fluid control body adapted for being received in a fluid housing, said fluid control body including a central cavity, and having a pressure supply passage at a first end and a radially extending pressure control passage; (2) a feed supply tube positioned in said central cavity, said feed supply tube including an outer diameter in communication with the pressure control passage, and including an inner bore operably connected to said pressure supply passage, said feed supply tube being supported in said central cavity of said fluid control body by way of a radially and axially extending wall, said wall being segmented into a plurality of longitudinally extending flow chambers, said feed supply tube including a valve receiving chamber area; (3) a valve seat portion being made of a metallic material and press fit into said fluid control body, said valve seat portion including a valve seat and a passage in communication between said valve seat and said pressure control passage; (4) a valve contained in said valve receiving chamber operable to selectively close off communication between said pressure supply passage and said pressure control passage; (5) a solenoid for opening said valve in response to a signal, wherein said solenoid includes a central axis and has a coil wound around a bobbin, spaced from and positioned around said central axis, said coil having radially stepped radial inner diameters; (6) a casing member for attaching said solenoid to said fluid control body; a portion of said casing member extending into the stepped portion of said coil for forming a flux tube therein; and (7) an armature axially movable within said bobbin.

In accordance with a third embodiment of the present invention, a solenoid fluid control valve is provided, comprising: (1) a fluid control body adapted for being received in a fluid housing, said fluid control body including a central cavity, and having a pressure supply passage at a first end and a radially extending pressure control passage; (2) a feed supply tube positioned in said central cavity, said feed supply tube including an outer diameter in communication with the pressure control passage, and including an inner bore operably connected to said pressure supply passage, said feed supply tube being supported in said central cavity of said fluid control body by way of a radially and axially extending wall, said wall being segmented into a plurality of longitudinally extending flow chambers, said feed supply tube including a valve receiving chamber area; (3) a valve seat portion being made of a metallic material and press fit into said fluid control body, said valve seat portion including a valve seat and a passage in communication between said valve seat and said pressure control passage; (4) a valve contained in said valve receiving chamber operable to selectively close off communication between said pressure supply passage and said pressure control passage; (5) a solenoid for opening said valve in response to a signal, wherein said solenoid includes a central axis and has a coil wound around a bobbin, spaced from and positioned around said central axis, said coil having radially stepped radial inner diameters; (6) a casing member for attaching said solenoid to said fluid control body; a portion of said casing member extending into the stepped portion of said coil for forming a flux tube therein; (7) an armature axially movable within said bobbin; (8) a pole piece assembly adjacent said armature and interposed between said bobbin and said fluid control body; and (9) a control rod extending along said central axis and through said pole piece assembly for opening of said valve, said control rod including a tapered end.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring to the Figures generally, and FIGS. 1–8 specifically, there is provided a solenoid control valve generally shown at 10, in accordance with the general teachings of the present invention. The solenoid control valve includes a fluid control body generally indicated at 12, and a solenoid portion generally indicated at 14. By way of a non-limiting example, the fluid control body 12 is preferably adapted for being received in a fluid manifold housing in a valve body of a transmission.

Figure 1:
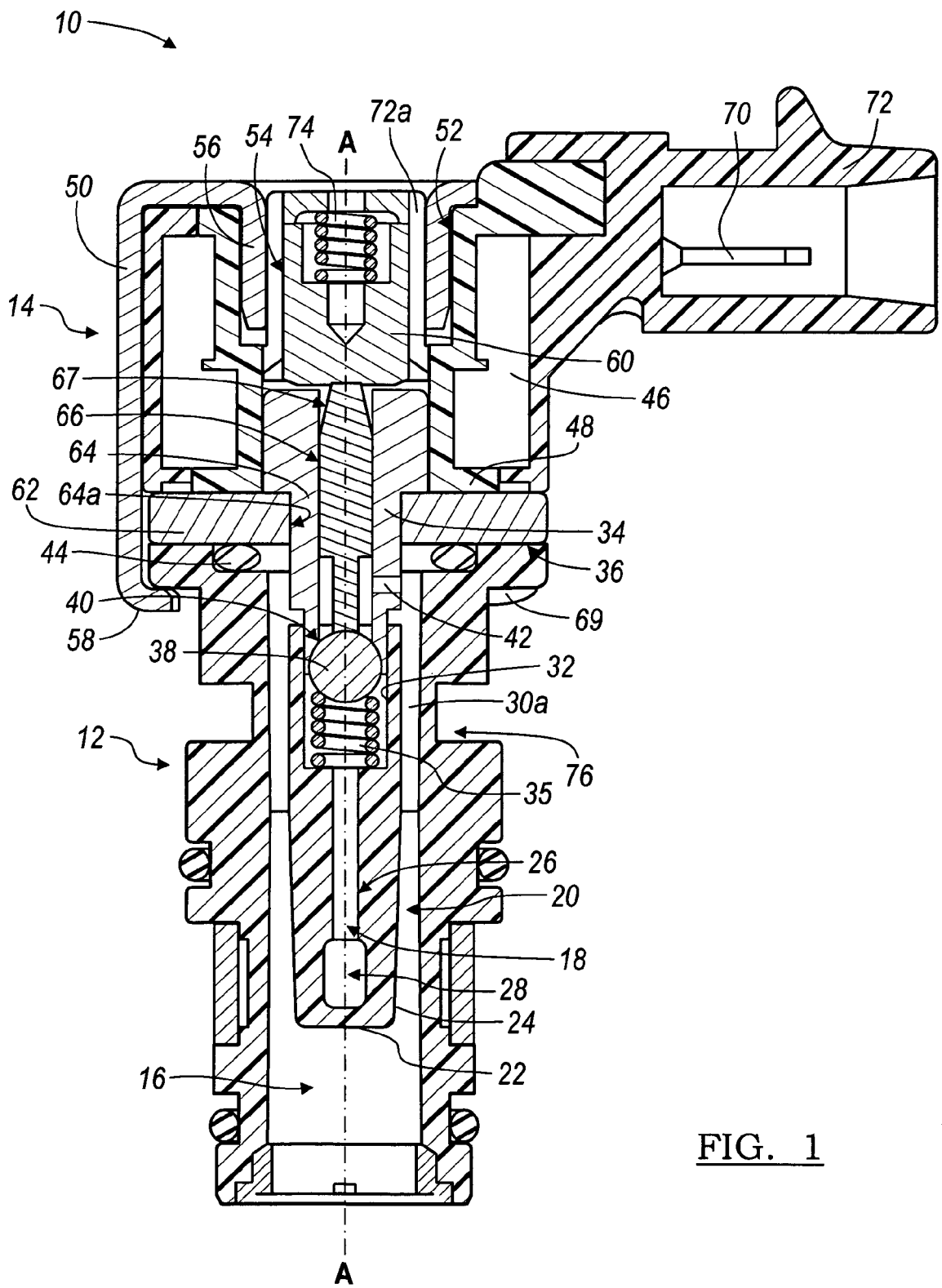
FIG. 1 is a cross-sectional view of the solenoid control valve of the present invention.
Figure 3:
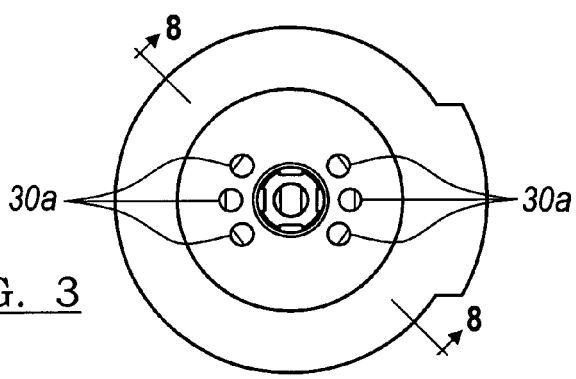
FIG. 3 is a top view of the control valve body of the present invention.
Figure 6:
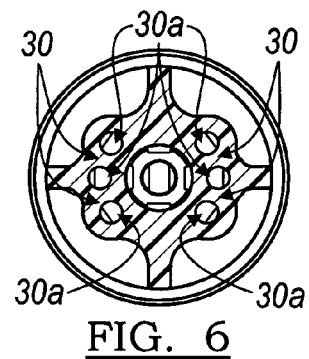
FIG. 6 is a sectional view taken along line 6—6 of FIG. 2.
Figure 2:
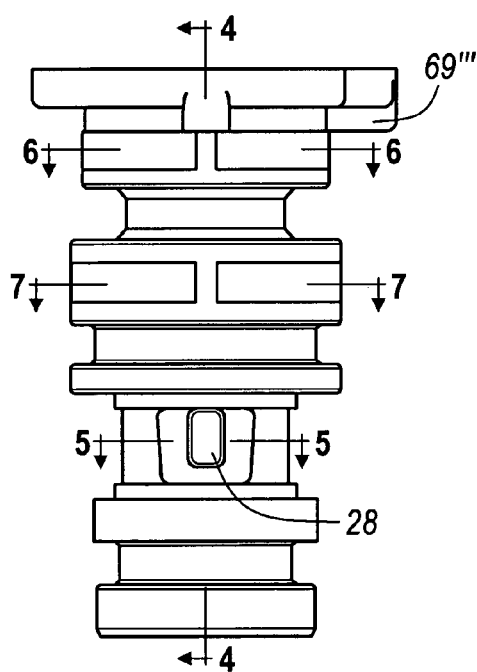
FIG. 2 is a side view of the control valve body of the present invention.
Figure 7:
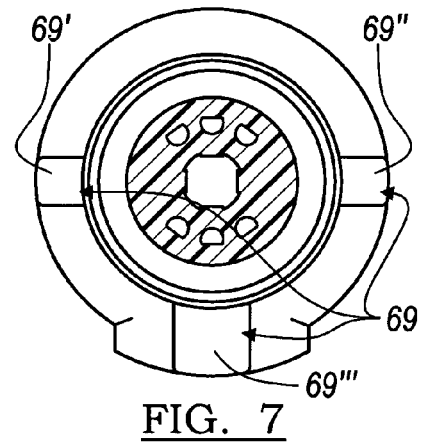
FIG. 7 is a sectional view taken along line 7—7 of FIG. 2.
Figure 5:
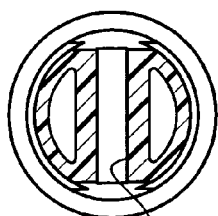
FIG. 5 is a sectional view taken along line 5—5 of FIG. 2.
Figure 8:
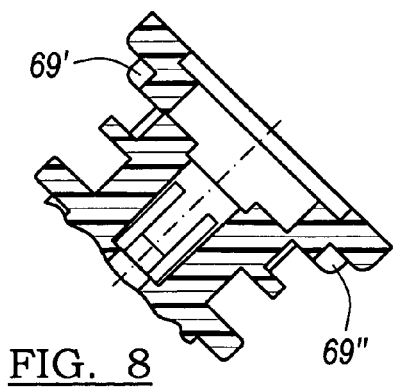
FIG. 8 is a second partially broken away sectional view of the valve body of the present invention.
Figure 4:
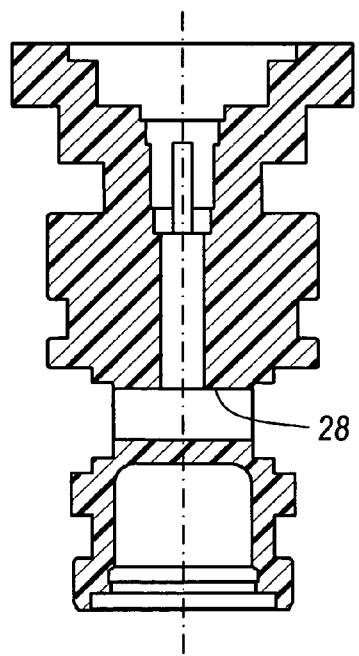
FIG. 4 is a sectional view taken along line 4—4 of FIG. 2.

The fluid control body 12 preferably includes a central cavity 16, wherein the central cavity 16 preferably includes a fluid supply passage 18 and a fluid control passage 20. These passages preferably communicate with either a supply line in the manifold or a control line, as is readily known in the art. A feed supply tube 22 is preferably integrally molded with the fluid control body 12. Feed supply tube 22 preferably includes an outer diameter 24. The outer diameter 24 is in communication with the control passage 20, and the feed supply tube 21 preferably includes an inner bore 26 in communication with the supply passage 18 through laterally extending port 28. The feed supply tube 22 is preferably supported in the cavity 16 by at least one or more segmented areas 30, best shown in FIG. 6. Preferably, there are three segmented flow passages 30a on each side of the feed supply tube 22, as shown in FIG. 6. The feed supply tube 22 preferably includes a valve receiving area 32.

A valve seat-forming portion 34 is preferably made out of a metal material and is press fit into the feed supply tube 22. The outer diameter of the valve seat-forming portion 34 is preferably press fit into the valve receiving area 32. By this arrangement, fluid passage is allowed to flow axially through the segmented flow passages 30a, while the webs forming the segmented areas 30 absorb press loads on the valve seat member 34. An alignment shelf 36 is preferably provided on the control body for providing proper depth of alignment of the valve seat member 34. A ball valve 38 is preferably held between the valve seat 40 and the valve retainer portion 32. A return spring 35 preferably biases the ball valve 38 toward valve seat 40. The valve seat member 34 preferably provides a passageway 42 to the control passage 20. The ball valve 38 is preferably operable to selectively cut off supply of flow from the supply channel 18 to the control passage 20. The first step of the path of fluid flow is that fluid enters into the lateral extending support 28 from outside of the solenoid control valve 10. The fluid then flows through the fluid supply passage 18 and into inner bore 26. Once the fluid enters the inner bore 26, the fluid will flow through ball valve 38, through passageway 42, and into the control passage 20. The solenoid control valve 10 is configured such that the lateral extending support 28 and the control passage 20 only communicate fluid through ball valve 38.

The valve seat member 34 is preferably press fit into the flux washer 62 forming a pole piece assembly 64. In a preferred embodiment, the flux washer 62 is preferably a stamped member and the valve seat member 34 is preferably a screw turned member. Assembly of these pieces together reduces the cost of the assembly.

Solenoid portion 14 is preferably secured to the fluid control body 12. An O-ring 44 is preferably disposed between the fluid control body 12 and the pole piece assembly 64. The solenoid 14 preferably includes a central axis A—A and has a coil 46 wound around a nonmagnetic bobbin member 48. The bobbin member 48 is preferably stepped radially, and includes a radially outward wall 52 and, a radially inward wall 54. A one-piece casing member 50 preferably includes a radially extending flux tube forming annular portion 56. The casing 50 also preferably crimpingly attaches the solenoid 14 to the body 12 by way of the crimped portion 58. An armature 60 is preferably provided, which fits within the wall 54 and is axially movable in response to a current in the coil. The pole piece assembly 64 is preferably secured between the lower portion of the bobbin 48 and the control body 12. The pole piece assembly 64 preferably includes a center orifice 64a which allows the valve seat member 34 to be press fit therein.

The control rod 66 preferably has a tapered upper end 67 and is movable within the valve seat member 34. The armature 60 preferably moves the control rod 66. The tapered pin preferably reduces magnetic flux shorting, thereby improving performance without sacrificing strength.

Assembly standoffs 69 are preferably provided. These standoffs are preferably axially radially extending rib members. These rib members act to preferably provide precise positioning of the casing 50 in the final solenoid control valve of the present invention. Specifically, a retention groove 76 is preferably provided that is engaged by a clip member (not shown) when securing the control valve 10 in a fluid manifold housing in a valve body of a transmission, for example. In the past, getting the fluid control body 12 axially positioned properly in the manifold housing for alignment of the clip with groove 76 has been problematic. These ribs ensure precise alignment during assembly for the clip to engage groove 76. A preferred embodiment has two ribs 69', 69", respectively, spaced 180° apart and a wider rib 69'" positioned 90° between ribs 69', 69", respectively.

The coil 46, bobbin 48 and coil contacts 70 are preferably overmolded to form connector 72. This forms a one-piece assembly that also preferably includes an armature cage assembly 72A portion that preferably holds armature 60 and its biasing spring 74 in place upon securement of the casing 50 to the fluid control body 12.

Figure 9:
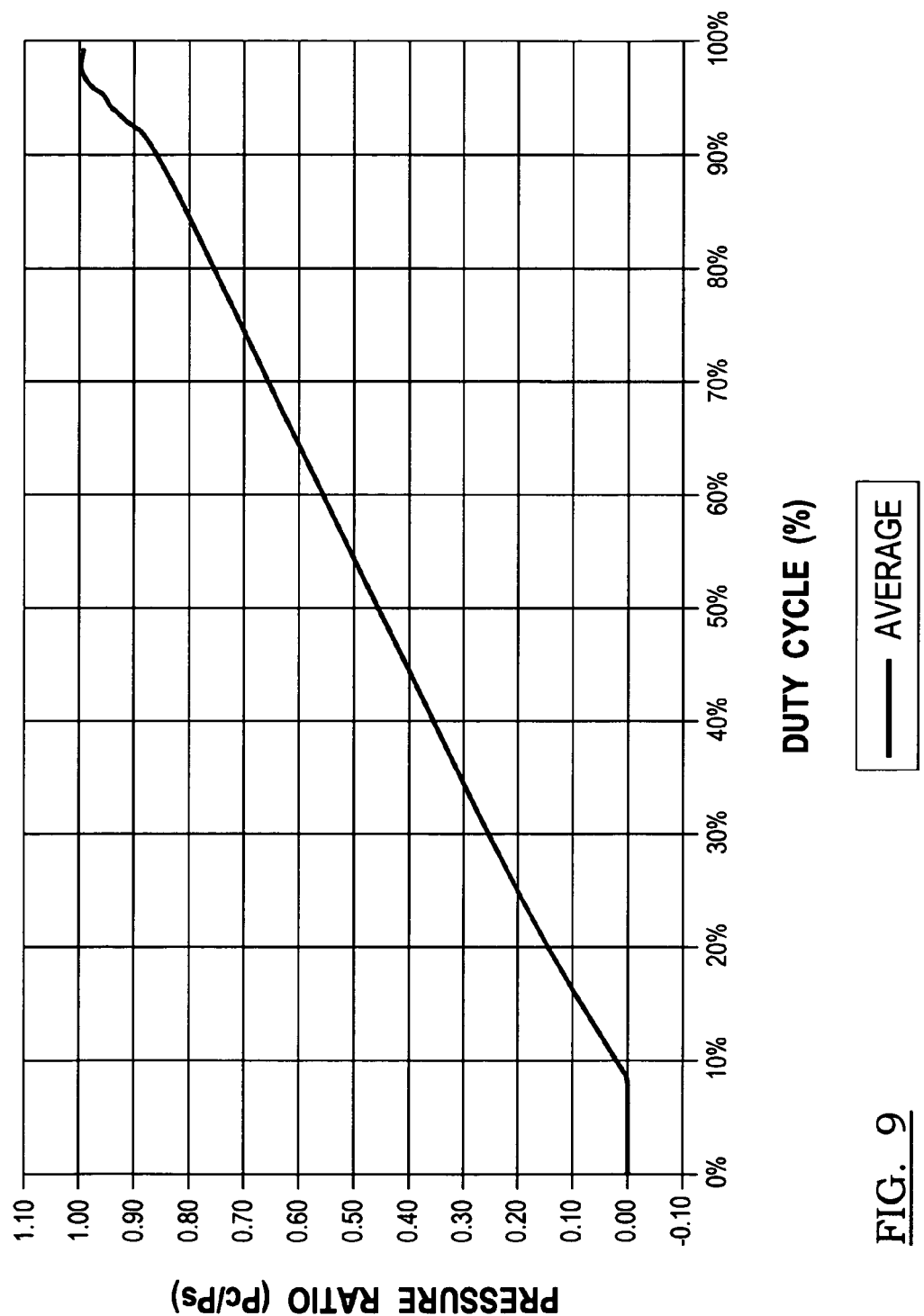
FIG. 9 is a performance curve of the operational characteristics of the present invention when operating at 40 psi.
Figure 10:
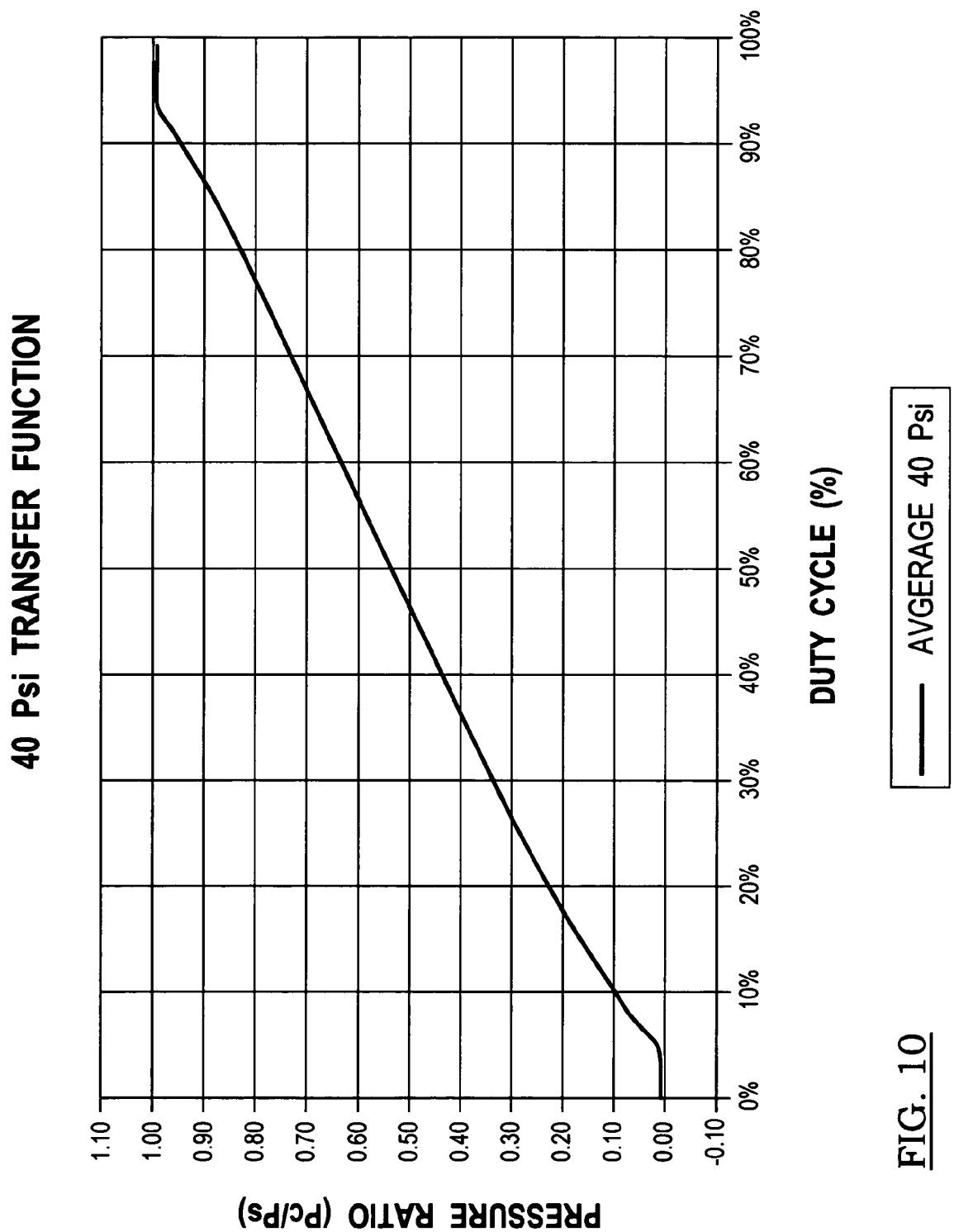
FIG. 10 is a performance curve of the operational characteristics of the present invention when operating at 120 psi.
Figure 11:
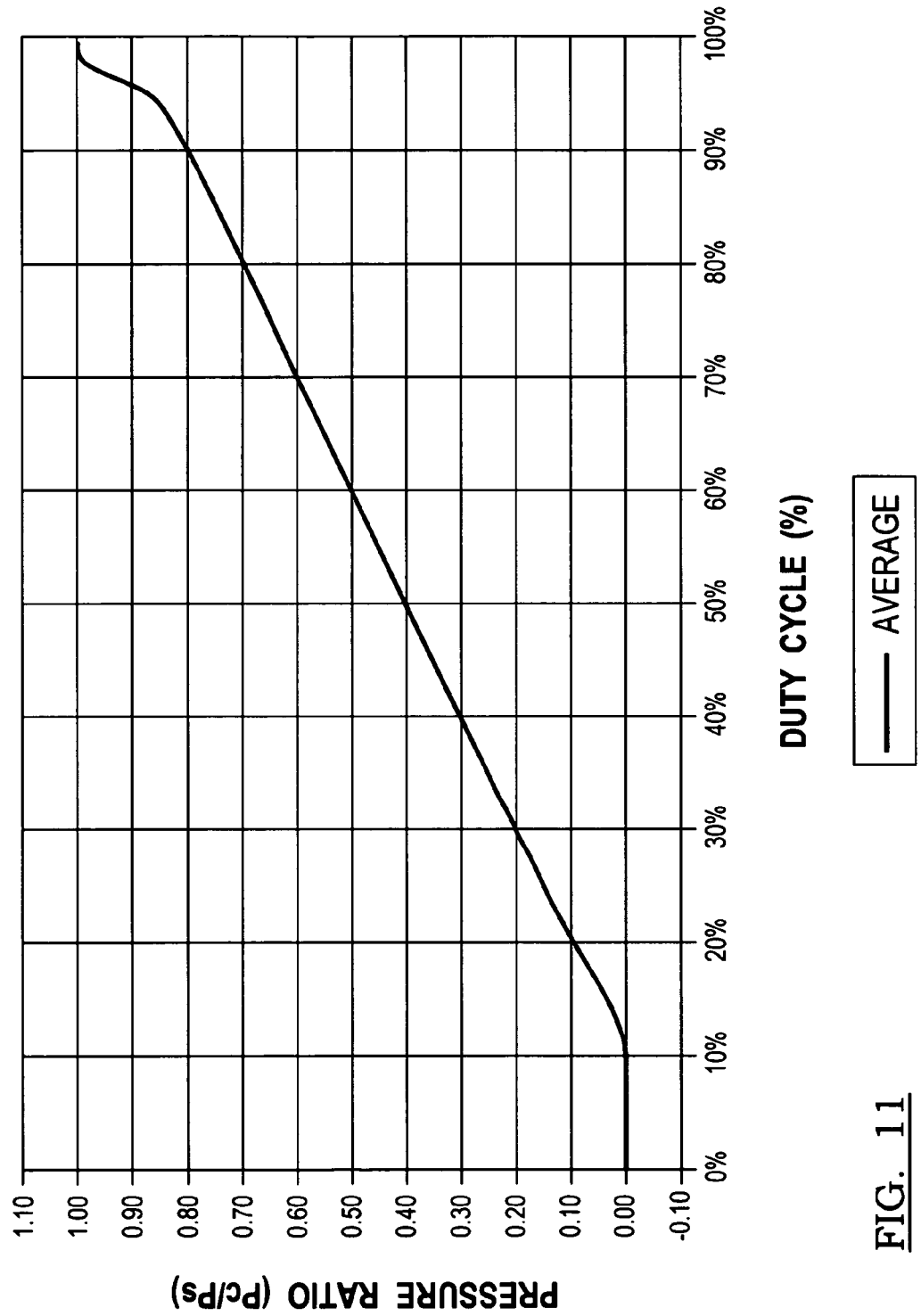
FIG. 11 is a performance curve of the operational characteristics of the present invention when operating at 215 psi.

Set forth in FIGS. 9 through 11 are transfer function progressions showing the duty cycle performance of the pulse width modulation of the solenoid of the present invention when operating with 40, 120 and 215 pounds per square inch of fluid pressure applied at the supply passage. As shown therein, the performance characteristics are optimized in the design of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A solenoid fluid control valve, comprising:
   a fluid control body adapted for being received in a fluid housing, said fluid control body including a central cavity, and having a pressure supply passage connected to said control body and a pressure control passage in said control cavity;
   a feed supply tube having an outer diameter positioned in said central cavity, said and including an inner bore operably connected to said pressure supply passage, said feed supply tube being supported in said central cavity of said fluid control body by way of a radially and axially extending wall, said wall having a plurality of longitudinally extending flow chambers in communication with said pressure control passage, said feed supply tube including a valve receiving area;
   a valve seat portion being made of a metallic material and press fit into valve receiving area, said valve seat portion including a valve seat and a passage in communication between said valve seat and said pressure control passage;
   a valve contained in said valve receiving area operable to selectively close off communication between said pressure supply passage and said pressure control passage; and
   a solenoid wherein solenoid has a moveble actuator rod contacting an armature, wherein said actuator rod has a tapered surface adjacent said armature that reduces flux shorting and improves operating characteristics for opening said valve in response to a signal.

2. The invention according to claim 1, wherein said solenoid includes a central axis and has a coil wound around a bobbin, spaced from and positioned around said central axis, said coil having radially stepped radial inner diameters and said armature is axially moveable within said bobbin.

3. The invention according to claim 2, further comprising a casing member for attaching said solenoid to said fluid control body; a portion of said casing member extending into the stepped portion of said coil for forming a flux tube therein.

4. The invention according to claim 2, wherein said bobbin and said coil are over molded in an integral unit with a connector member.

5. The invention according to claim 3, further comprising an armature axially movable within a bobbin.

6. The invention according to claim 5, further comprising a pole piece assembly adjacent said armature and interposed between said bobbin and said fluid control body.

7. The invention according to claim 5, wherein a cage is formed for retaining the armature therein.

8. The invention according to claim 6, wherein said pole piece assembly includes a stamped flux washer member and a press-fit valve seat member.

9. The invention according to claim 1, further comprising a passageway extending through said feed supply tube and said plurality of said longitudinally extending flow chambers are operably connected at a first end to said passageway and at a second end to said pressure control passage.

10. The invention according to claim 1, wherein said valve is a ball valve.

11. The invention according to claim 1, wherein said fluid control body is made of a polymer material.

12. The invention according to claim 1, wherein said fluid control body has an upper radially extending lip member and at least one axially protruding positioning rib extending therefrom.

13. A solenoid fluid control valve, comprising:
   a fluid control body adapted for being received in a fluid housing, said fluid control body including a central cavity, and having a pressure supply passage connected to said control body and a control passage in said central cavity;
   a feed supply tube positioned in said central cavity, said feed supply tube including an outer diameter positioned in said central cavity including an inner bore operably connected to said pressure supply passage, said feed supply tube being supported in said central cavity of said fluid control body by way of a radially and axially extending wall, said wall being segmented into a plurality of longitudinally extending flow chambers in communication with said pressure control passage, said feed supply tube including a valve receiving area;
   a valve seat portion being made of a metallic material and press fit into said valve receiving area, said valve seat portion including a valve seat and a passage in communication between said valve seat and said pressure control passage;

a valve contained in said valve receiving area operable to selectively close off communication between said pressure supply passage and said pressure control passage;

a solenoid for opening said valve in response to a signal, wherein said solenoid includes a central axis and has a coil wound around a bobbin, spaced from and positioned around said central axis, said coil having radially stepped radial inner diameters;

a casing member for attaching said solenoid to said fluid control body; a portion of said casing member extending into the stepped portion of said coil for forming a flux tube therein;

an armature axially movable within said bobbin; and an actuator rod contacting said armature, wherein said actuator rod has a tapered surface adjacent said armature that reduces flux shorting and improves operating characteristics.

14. The invention according to claim 13, further comprising a pole piece assembly adjacent said armature and interposed between said bobbin and said fluid control body.

15. The invention according to claim 14, wherein said pole piece assembly includes a stamped flux washer member and a press-fit valve seat member.

16. The invention according to claim 13, further comprising a passageway extending through said feed supply tube and said plurality of said longitudinally extending flow chambers are operably connected at a first end to said passageway and at a second end to said pressure control passage.

17. The invention according to claim 13, wherein said valve is a ball valve.

18. The invention according to claim 13, wherein said bobbin and said coil are over molded in an integral unit with a connector member.

19. The invention according to claim 13, wherein a cage is formed for retaining the armature therein.

20. The invention according to claim 13, wherein said fluid control body is made of a polymer material.

21. The invention according to claim 13, wherein said fluid control body has an upper radially extending lip member and at least one axially protruding positioning rib extending therefrom.

22. A solenoid fluid control valve, comprising:

a fluid control body adapted for being received in a fluid housing, said fluid control body including a central cavity, and having a pressure supply passage connected to said control body and a control passage in said central cavity;

a feed supply tube positioned in said central cavity, said feed supply tube including an outer diameter positioned in said central cavity, and including an inner bore operably connected to said pressure supply passage, said feed supply tube being supported in said central cavity of said fluid control body by way of a radially and axially extending wall, said wall being segmented into a plurality of longitudinally extending flow chambers in communication with said pressure control passage, said feed supply tube including a valve receiving area;

a valve seat portion being made of a metallic material and press fit into said valve receiving area, said valve seat portion including a valve seat and a passage in communication between said valve seat and said pressure control passage;

a valve contained in said valve receiving area operable to selectively close off communication between said pressure supply passage and said pressure control passage;

a solenoid for opening said valve in response to a signal, wherein said solenoid includes a central axis and has a coil wound around a bobbin, spaced from and positioned around said central axis, said coil having radially stepped radial inner diameters;

a casing member for attaching said solenoid to said fluid control body; a portion of said casing member extending into the stepped portion of said coil for forming a flux tube therein;

an armature axially movable within said bobbin;

a pole piece assembly adjacent said armature and interposed between said bobbin and said fluid control body; and a control rod extending along said central axis and through said pole piece assembly for opening of said valve, said control rod including a tapered end.

23. The invention according to claim 22, further comprising a passageway extending through said feed supply tube and said plurality of said longitudinally extending flow chambers are operably connected at a first end to said passageway and at a second end to said pressure control passage.

24. The invention according to claim 22, wherein said valve is a ball valve.

25. The invention according to claim 22, wherein said pole piece assembly includes a stamped flux washer member and a press-fit valve seat member.

26. The invention according to claim 22, wherein said bobbin and said coil are over molded in an integral unit with a connector member.

27. The invention according to claim 22, wherein a cage is formed for retaining the armature therein.

28. The invention according to claim 22, wherein said fluid control body is made of a polymer material.

29. The invention according to claim 22, wherein said fluid control body has an upper radially extending lip member and at least one axially protruding positioning rib extending therefrom.

30. The invention according to claim 22 wherein said tapered end of said control rod contacts said armature and reduces flux shorting and improves operating characteristics.

* * * * *